United States Patent [19]

Suda

[11] B 3,995,608

[45] Dec. 7, 1976

[54] IGNITION TIMING CONTROL SYSTEM FOR INTERNAL COMBUSTION ENGINE

[75] Inventor: Seiji Suda, Mito, Japan

[73] Assignees: Hitachi, Ltd.; Nissan Motor Co., Ltd., both of Japan

[22] Filed: June 18, 1974

[21] Appl. No.: 480,473

[44] Published under the second Trial Voluntary Protest Program on March 2, 1976 as document No. B 480,473.

[52] U.S. Cl. .......................... 123/148 E; 123/117 R; 123/146.5 A
[51] Int. Cl.² .............................................. F02P 1/00
[58] Field of Search ................ 123/117 R, 146.5 A, 123/148 E

[56] References Cited
UNITED STATES PATENTS

| | | |
|---|---|---|
| 3,550,571 | 12/1970 | Mainprize ........................ 123/148 E |
| 3,559,629 | 2/1971 | Sauvignet ........................ 123/148 E |
| 3,587,552 | 6/1971 | Varaunt .......................... 123/148 E |
| 3,592,178 | 7/1971 | Schiff .............................. 123/117 R |
| 3,660,689 | 5/1972 | Oishi et al. ...................... 123/148 E |
| 3,738,339 | 6/1973 | Huntzinger et al. ........... 123/146.5 A |
| 3,800,757 | 4/1974 | Finch .............................. 123/117 R |
| 3,890,944 | 6/1975 | Werner .......................... 123/148 E |

Primary Examiner—Charles J. Myhre
Assistant Examiner—Paul Devinsky
Attorney, Agent, or Firm—Craig & Antonelli

[57] ABSTRACT

An electronic ignition timing control system for controlling the advance angle of ignition timing of an internal combustion engine, in which an electrical signal for controlling the advance angle is applied to an ignition timing control circuit separately from a trigger pulse signal used to set the ignition timing so as to obtain an advance angle controlled output from the ignition timing control circuit.

7 Claims, 3 Drawing Figures

IGNITION TIMING CONTROL SYSTEM FOR INTERNAL COMBUSTION ENGINE

The present invention relates to an ignition timing control system for internal combustion engines.

The advance angle control for advancing or retarding the ignition timing of an internal combustion engine is generally carried out by mechanical control means. According to such mechanical control means, the position of a cam relative to the position of breaker contacts or the position of an armature relative to the position of an electromagnetic pickup coil is varied depending on the number of revolutions (rpm) of the engine or the value of negative pressure in the intake manifold to obtain an advance angle controlled electrical trigger signal which is utilized for controlling the ignition timing.

With the severer restrictions imposed on engine exhaust gases in recent years, capability of accurate control of engine ignition timing over a wide range and capability of simple adjustment of the setting have been demanded more and more. However, none of the mechanical control means above described have been able to sufficiently satisfy such demands.

In accordance with the present invention there is provided an ignition timing control system for an internal combustion engine comprising trigger pulse generating means for generating a reference signal in synchronism with the rotation of the engine, first voltage generating means for generating a voltage having a level proportional to the generating period of the reference signal, second voltage generating means for generating a voltage whose initial level is determined by the output voltage of the first voltage generating means appearing in response to the application of the reference signal and which varies subsequently along a constant gradient, and an output circuit for generating a signal output when the output voltage of the second voltage generating means attains a predetermined value, the system being connected to an advance angle control voltage generator generating an output controlled depending on the operating conditions of the engine so that at least one of the voltage proportional constants of the first and second voltage generating means can be varied by the output signal of the advance angle control voltage generator.

According to one feature of the present invention, an ignition timing control system can accurately control the ignition timing of an internal combustion engine over a wide range depending on variations of the operating conditions of the engine and which makes possible to simply adjust the setting.

In one embodiment of the present invention, the mechanical advance angle control means used in the prior art system is eliminated, and a trigger signal which is not subjected to any angle advance control and an electrical signal which is generated depending on the operating conditions of an engine to determine the value of advance angle are applied to an ignition timing control circuit for controlling the advance angle during ignition.

The present invention will now be described by way of example in conjunction with the accompanying drawing, in which.

Figure 1:
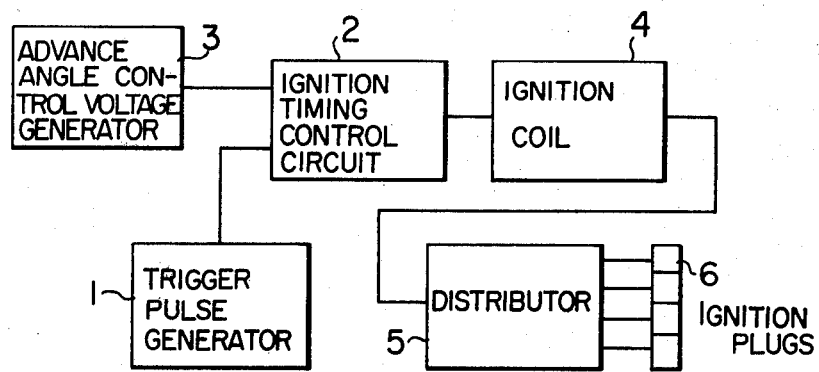
FIG. 1 is a block diagram showing schematically the structure of an engine ignition system employing an ingnition timing control circuit according to the present invention.

Referring to FIG. 1, a generator 1 generates a reference signal, e.g., a train of trigger pulses in synchronism with the rotation of an internal combustion engine. The output of the trigger pulse generator 1 and the output of an advance angle control voltage generator 3 are applied to an ignition timing control circuit 2 which determines the ignition timing of the engine. The output voltage level of the advance angle control voltage generator 3 is controlled on the basis of actually measured values of the factors including the engine r.p.m, negative pressure in the intake manifold, temperature of engine cooling water and gear position in the transmission. The output of the ignition timing control circuit 2 is distributed to ignition plugs 6 through an ignition coil 4 and a distributor 5.

Figure 2:
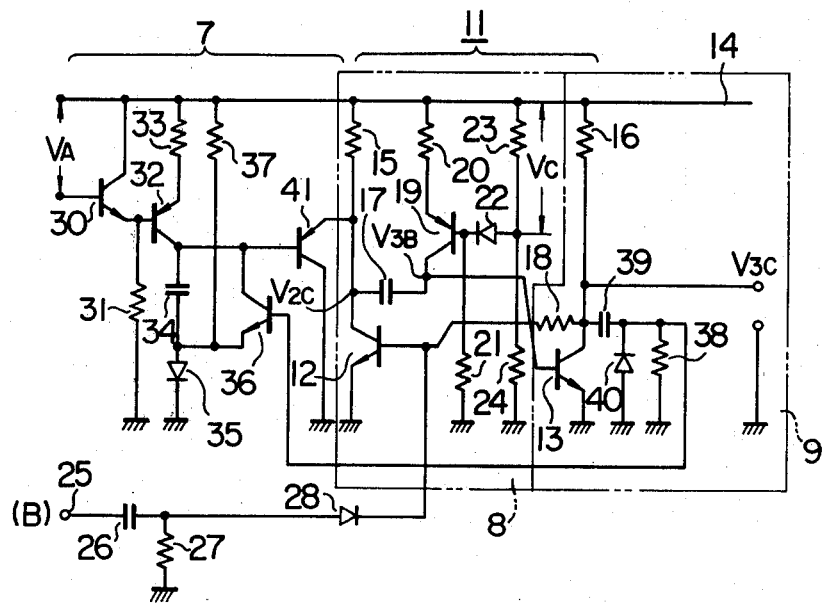
FIG. 2 is a circuit diagram of one form of the ignition timing control circuit in the engine ignition system shown in FIG. 1.

The structure of the ignition timing control circuit 2 is shown in detail in FIG. 2.

Referring to FIG. 2, first voltage generating means 7 applies a control signal to second voltage generating means 8 in a monostable multivibrator 11 so as to control the value at which the collector voltage of a transistor 12 in the second voltage generating means 8 is clamped. The monostable multivibrator 11 includes an output circuit 9 in addition to the second voltage generating means 8. This monostable multivibrator 11 is composed of a pair of npn transistors 12 and 13 of grounded emitter configuration, resistors 15 and 16 for connecting the collectors of the respective transistors 12 and 13 to a power supply line 14, a capacitor 17 connected between the collector of the transistor 12 and the base of the transistor 13, a resistor 18 connected between the collector of the transistor 13 and the base of the transistor 12, and a series circuit including the collector and emitter of an npn transistor 19 and a resistor 20 for connecting the base of the transistor 13 to the power supply line 14. The base of the transistor 19 is grounded through a resistor 21 and is connected to the connection point of voltage dividing resistors 23 and 24 through a diode 22 arranged in a reverse direction as shown.

The trigger pulse generator 1 is connected to a trigger input terminal 25. This trigger input terminal 25 is connected to the base of the transistor 12 through a differentiator consisting of a capacitor 26 and a resistor 27 and through a diode 28 arranged in a forward direction. Thus, the monostable multivibrator 11 is triggered during the rise time of the voltage applied to the trigger input terminal 25.

An npn transistor 30 in the first voltage generating means 7 has its collector directly connected to the power supply line 14 and its emitter grounded through a resistor 31 so that a voltage corresponding to the voltage $V_A$ applied across the power supply line 14 and the base of the transistor 30, hence the output voltage of the advance angle control voltage generator 3 appears at the emitter of the transistor 30.

A pnp transistor 32 serving as a constant current means has its emitter connected to the power supply line 14 through a resistor 33, its base connected to the emitter of the transistor 30, and its collector grounded through a capacitor 34 and a diode 35 arranged in a forward direction. The capacitor 34 is connected across the emitter and collector of an npn transistor 36.

This transistor 36 has its emitter connected to the power supply line 14 through a resistor 37, and its base grounded through a resistor 38. The base of the transistor 36 is further connected to the collector of the transistor 13 in the monostable multivibrator 11 through a capacitor 39. A diode 40 is connected in parallel with the resistor 38 so as to cause quick discharge of the capacitor 39. An npn transistor 41 is provided so that the collector voltage of the transistor 12 in the monostable multivibrator 11 can be clamped in proportional relation to the collector voltage of the transistor 32, hence the terminal voltage of the capacitor 34. This transistor 41 has its emitter connected to the collector of the transistor 12, its base connected to the collector of the transistor 32, and its collector grounded.

The operation of the ignition timing control circuit will be described with reference to FIG. 3. In this description, it is supposed that the engine has four cylinders.

Figure 3:
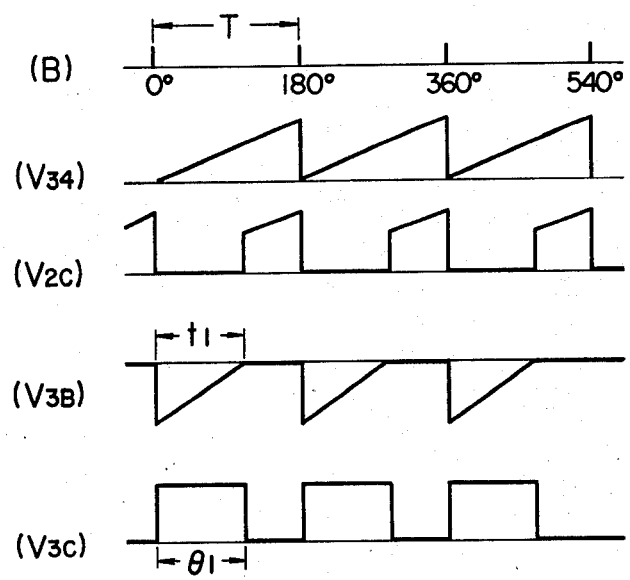
FIG. 3 shows waveforms appearing at various parts of the ignition timing control circuit shown in FIG. 2.

Referring to FIG. 3, a trigger pulse signal B consisting of 180° spaced apart trigger pulses is applied to the trigger input terminal 25 from the trigger pulse generator 1. In each period T of this trigger pulse signal B, the monostable multivibrator 11 is placed in a quasi-stable state and the transistor 36 conducts so that the voltage of the capacitor 34 in the first voltage generating means 7 is momentarily reduced to zero. Since the capacitor 34 is charged by the collector current $I = V_A/R_{33}$ ($R_{33}$: the resistance of the resistor 33) of the constant current supplying transistor 32, the terminal voltage $V_{34}$ of the capacitor 34 has the following value when the transistor 36 is cut off:

$$V_{34} = \frac{V_A}{R_{33}} \times \frac{t}{C_{34}}$$

where $t$ is the time after cut-off of the transistor 36, and $C_{34}$ is the capacitance of the capacitor 34.

The collector voltage $V_{2C}$ of the transistor 12 in the second voltage generating means 8 is clamped at this power supply value by the transistor 41 in the first voltage generating means 7. Thus, in the position in which the trigger pulse signal is applied, the collector voltage $V_{2C}$ of the transistor 12 has the following value:

$$V_{2C} = \frac{V_A}{R_{33} \times C_{34}} \times T$$

Therefore, the capacitor 17 in the second voltage generating means 8 is also charged to have the same voltage value. A reverse bias voltage $V_{3B}$ is applied to the transistor 13 in the output circuit 9 to establish a quasi-stable state in response to the application of the trigger pulse signal B from the trigger pulse generator 1. As a result, an output voltage $V_{3C}$ appears at the collector of the transistor 13. In this region, the capacitor 17 discharges with the collector current of the constant current controlled transistor 19, and upon completion of this discharge, the monostable multivibrator 11 constituting the second voltage generating means 8 and output circuit 9 is restored to the original state.

This quasi-stable period of time $t_1$ is given by $$t_1 = \frac{R_{20} \times C_{17}}{V_C} \times \frac{V_A}{R_{33} \times C_{34}} \times T$$

where $V_C$ is the voltage applied across the resistor 23, $R_{20}$ is the resistance of the resistor 20, and $C_{17}$ is the capacitance of the capacitor 17. Suppose that the number of revolutions of the engine is N r.p.m., then the rotating angle $0_1$ during the period of time $t_1$ is given by $$0_1 = t_1 \times 360 \times n$$

where $n = N/60$. Since the period T is given by $T = 1/2n$, $0_1$ is expressed as $$\theta_1 = 180 \times \frac{R_{20} \times C_{17}}{V_C} \times \frac{1}{R_{33} \times C_{34}} \times V_A$$

Thus, the input voltage $V_A$ of the transistor 30 can be used for controlling the angle $0_1$ through which the monostable multivibrator 11 is restored to the original state and the collector voltage $V_{3C}$ of the transistor 13 disappears. This angle $0_1$ may be delayed relative to the preceding trigger pulse signal and advanced relative to the succeeding trigger pulse signal. It will thus be understood that the ignition timing control circuit can control the advance angle (lag angle) of an ignition system for internal combustion engines.

In the embodiment above described, an arrangement is provided so that the collector current of the transistor 32 in the first voltage generating means 7 is variable. It is apparent however that the same effect can be obtained by arranging so that the collector current of the transistor 19 in the second voltage generating means 8 can be varied by varying the voltage $V_C$ across the resistor 23.

What is claimed is:

1. An ignition timing control system for an internal combustion engine comprising, in combination:
   first means for generating a first pulse reference signal in synchronism with the rotation of the engine;
   second means for generating an advance angle control signal representative of the operating condition of the engine;
   third means, coupled to said first and second means, for generating a first voltage, the amplitude of which is proportional to the lapse of time from the generation of the first pulse reference signal from said first means, and including a first charge storage circuit, and a first constant current circuit connected thereto for supplying a constant charging current to said first charge storage circuit in accordance with the advance angle control signal from said second means, the charge stored by said first charge storage circuit corresponding to said first voltage;
   fourth means, coupled to said first and third means, for generating a second voltage, the amplitude of which decreases along a prescribed linear gradient from the level of said first voltage toward a first reference voltage in response to the receipt of a first pulse reference signal from said first means, and including a first switching circuit and a second charge storage circuit coupled thereto, said second charge storage circuit being coupled to said first charge storage circuit to store a charge corresponding to level of said first voltage, said switching circuit being coupled to receive said first pulse reference signal so as to initiate the discharge of said second charge storage circuit in response thereto, so that said second charge storage circuit produces a voltage corresponding to said second voltage decreasing along said prescribed linear gradient and to terminate the discharge of said second charge storage circuit upon the level of said second voltage reaching the level of said first reference voltage; and fifth means, coupled to said fourth means, for generating an output signal upon the level of said second voltage reaching the level of said first reference signal.

2. An ignition timing control system according to claim 1, wherein said fourth means comprises a monostable multivibrator including first and second switching elements making up said first switching circuit and a capacitor coupled between said first and second switching elements, corresponding to said second charge storage circuit.

3. An ignition timing control system according to claim 2, wherein said fourth means further comprises a further constant current circuit, coupled to said capacitor, for supplying a constant discharge current to said capacitor.

4. An ignition timing control system according to claim 1, wherein said first charge storage circuit comprises a capacitor coupled to said constant current circuit and further including a second switching circuit, connected across the capacitor of said first charge storage current and responsive to said first pulse reference signal to temporarily discharge the capacitor.

5. An ignition timing control system according to claim 1, further comprising a coupling transistor connected between said first charge storage circuit and said second charge storage circuit.

6. An ignition timing control system according to claim 3, wherein said first charge storage circuit comprises a capacitor coupled to said constant current circuit and further including a second switching circuit, connected across the capacitor of said first charge storage current and responsive to said first pulse reference signal to temporarily discharge the capacitor.

7. An ignition timing control system according to claim 6, further comprising a coupling transistor connected between the respective capacitors of said first and second charge storage circuits.

* * * * *

UNITED STATES PATENT OFFICE
CERTIFICATE OF CORRECTION

Patent No. 3,995,608    Dated December 7, 1976

Inventor(s) Seiji SUDA

It is certified that error appears in the above-identified patent and that said Letters Patent are hereby corrected as shown below:

Claim 4, column 6, line 6, "current" should read -- circuit --

Claim 6, column 6, line 16, "current" should read -- circuit --

Signed and Sealed this

Twenty-ninth Day of January 1980

[SEAL]

Attest:

Attesting Officer

SIDNEY A. DIAMOND

Commissioner of Patents and Trademarks